May 25, 1937.  C. C. FARMER  2,081,698
BRAKE PIPE HOLDING MEANS
Filed Oct. 4, 1933
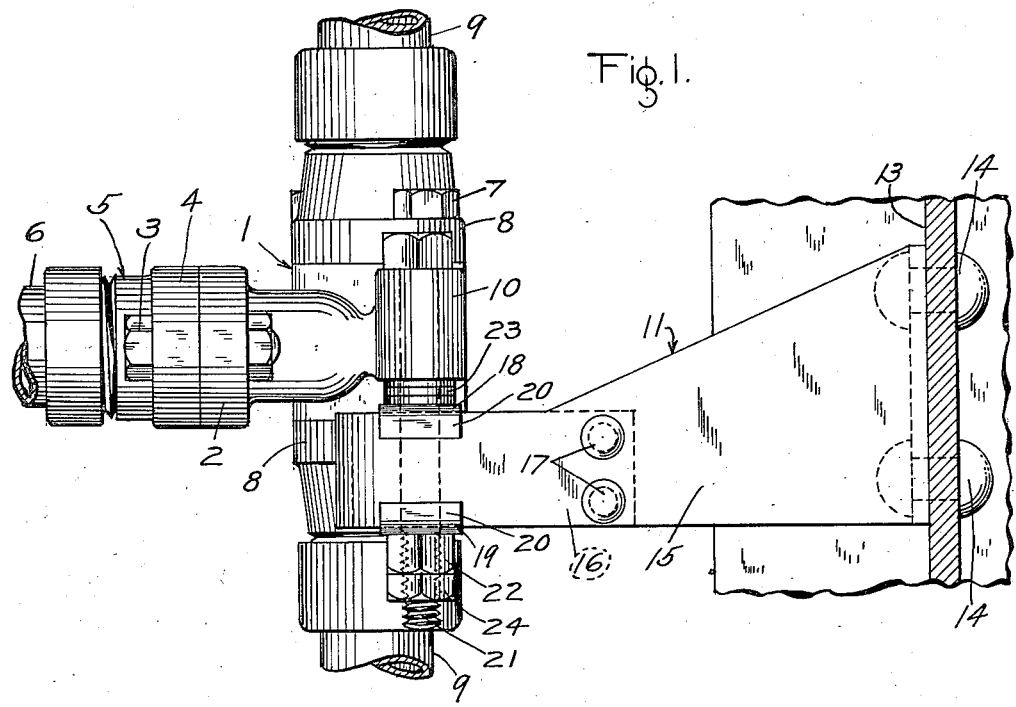
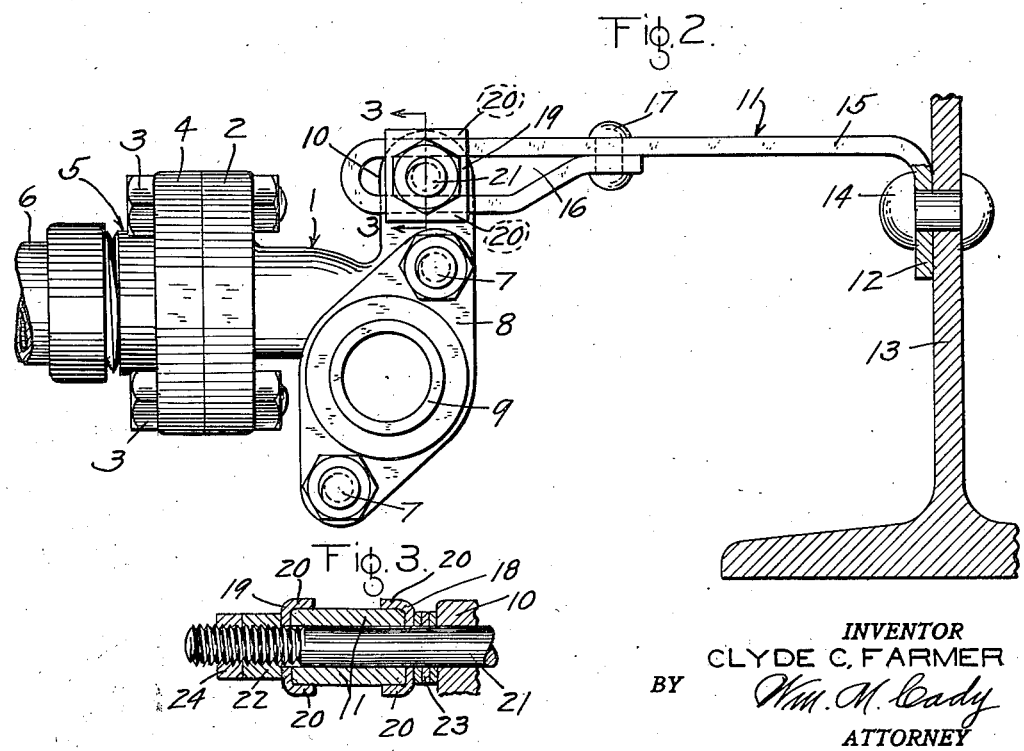
INVENTOR
CLYDE C. FARMER
BY Wm. M. Cady
ATTORNEY Patented May 25, 1937

2,081,698

UNITED STATES PATENT OFFICE 2,081,698

BRAKE PIPE HOLDING MEANS

Clyde C. Farmer, Pittsburgh, Pa., assignor to The Westinghouse Air Brake Company, Wilmerding, Pa., a corporation of Pennsylvania Application October 4, 1933, Serial No. 692,089

6 Claims. (Cl. 285—209)

This invention relates to pipe holding structures, and more particularly to such a structure for holding the piping of a railway car fluid pressure brake equipment.

The principal object of my invention is to provide a structure for rigidly holding the brake pipe, said structure being adjustable, so as to avoid setting up strains in the piping.

In a railway car, it is customary to secure the fluid pressure brake pipe to the car underframe by means of hangers which take a frictional grip upon the pipe. The brake controlling valve device is connected to the brake pipe by means of a branch pipe. If the brake pipe shifts longitudinally in its hangers, due for instance to the car being bumped against another car in making up a train or due to the pull exerted on the brake pipe by connected brake pipe hose when adjacent cars are being uncoupled and separated, the branch pipe is likely to be fractured or its connections with the brake pipe or the controlling valve device are likely to become broken or otherwise disturbed.

Another object of my invention is to provide a simple and inexpensive structure for rigidly holding the brake pipe at the branch pipe T against longitudinal movement, and having means for adjusting the positioning of the holding means relatively to the brake pipe and the branch pipe T, so that proper alignment between the holding means and the branch pipe T may be obtained before the parts are rigidly connected together, and thus undue strains on the piping and pipe joints are avoided.

In the accompanying drawing; Fig. 1 is a top plan view of a branch pipe T and my improved structure for holding the same, said holding structure being shown secured to the center sill of a railway car; Fig. 2 is an end elevational view of the branch pipe T and the holding structure, the center sill and a portion of the holding bracket being shown in section; and Fig. 3 is a sectional view taken on the line 3—3 of Fig. 2.

Referring to the drawing, the brake pipe may comprise a branch pipe T 1, which is preferably provided with a flange 2 adapted to be secured by means of bolts 3 to a counterpart flange 4 of a union fitting 5, which union fitting may be of the general type disclosed in the pending application of Ellis E. Hewitt, Serial No. 575,985, filed November 19, 1931, now matured into Patent No. 1,956,683, May 1, 1934, into which fitting is screwed a section 6 of the branch pipe. The branch pipe T is also preferably provided, at opposite ends of the brake pipe conduit opening, with faces to which are secured, by means of the bolts 7, the union fitting 8, which may also be of the general type disclosed in the above mentioned application. A section 9 of the brake pipe which extends lengthwise or longitudinally of the car is screwed into each of the last two mentioned fittings.

It should be understood that whereas the drawing shows my holding structure associated with a T adapted to be connected to the brake pipe and to the branch pipe through the medium of union fittings of the type disclosed in the aforementioned pending application, my holding structure may also be applied to a T of the usual type into which the brake pipe and the branch pipe sections are directly screwed.

A boss 10 is provided at the top of the T, in the present embodiment of the invention, which extends longitudinally of the T and has an opening therethrough aligned preferably with the longitudinal axis of the T.

For holding the branch pipe T, I provide a bracket 11 which may comprise a flange 12 adapted to be secured to the center sill 13 or any other suitable member of the car, in any desired manner, such as by rivets 14. Extending outwardly from the flange 12 is an arm 15, at the outer end of which is an opening 16 elongated in a direction transversely of the car, and so disposed that it is adapted to register with the aforementioned opening in the lug 10. As shown in the drawing, this bracket may be made from a piece of sheet metal which may be bent at one end to form the flange 12 and which may be looped upon itself at the other end so as to form the elongated opening 16. The extremity of the portion which is bent over upon itself to form the opening 16 may be secured to the arm 15 by means of the rivets 17, or by any other desired means.

The bracket 11 is so located with respect to the branch pipe T that it will preferably be spaced a slight distance away from one face of the lug 10.

Clamping plates 18 and 19 are provided, each of which is adapted to engage one side of the looped end of the arm 15 of the bracket 11 and has an opening therethrough adapted to register with the opening 16 in said bracket. Said clamping plates are provided with flanges 20 which are adapted to engage the upper and lower faces, respectively, of the looped end of said arm so as to prevent said clamping plates from rotating.

Assuming that the brake pipe has been made up and clamped to the car underframe in the usual manner and that the brake pipe branch pipe has been installed, a bolt 21 is passed through the opening in the lug 10 and through the required number of shims 23, or washers, to fill the space between the adjacent faces of the lug and the clamping plate 18. The bolt 21 is then passed through the opening in the clamping plate 18, the elongated opening 16 in the bracket 11 and the opening in the clamping plate 19, the threaded end of the bolt extending beyond the plate 19, on which end a nut 22 is turned to clamp the plates 18 and 19 and the lug 10 rigidly to the bracket 11. A lock nut 24 may be screwed onto the bolt 21 to prevent the nut 22 from working loose. It will be noted that the flanges 20 of the clamping plates 18 and 19, through their engagement with the upper and lower surfaces of the looped end of the bracket 11 maintain said clamps in a position for effective clamping.

Assuming that the elongated opening 16 in the bracket 11 registers with the opening in the lug 10 before the bolt 21 is passed through said openings and assuming that the required number of shims 23 have been used to fill up the space between adjacent faces of the lug 10 and the clamping plate 18, it is obvious that the nut 22 may be drawn up tight on the bolt 21 without setting up any strains in the brake pipe or in the branch pipe.

Obviously, if the installation conditions are such that the adjacent faces of the lug 10 and the clamping plate 18 just engage before the bolt 21 is applied, the shims 23 will not be required, and if the elongated opening 16 does not register with the opening in the lug 10 before the bolt 21 is applied, the arm 15 of the bracket 11 may be bent either upwardly or downwardly, as required, to effect registration of these openings.

If, for any reason, it should be desired to disconnect and remove the branch pipe from a T where a union fitting, such as is disclosed in the aforementioned pending application, is used to connect same, the nuts 22 and 24 are backed off from the bolt 21 sufficiently to release the T from the clamping action hereinbefore mentioned. The bolts 3 associated with the union fitting 5 are then removed and the T may then be moved inwardly relative to the bracket 11, due to the engagement of the bolt 21 within the elongated opening 16, a sufficient distance to permit ready removal of the branch pipe.

It will be seen from the foregoing that I have provided a pipe holding structure which provides for a certain amount of variation in the location of the branch pipe T in a longitudinal direction, in a transverse direction and in a vertical direction, and rigidly holds the pipe without setting up any strains in the piping. It will also be evident that the holding structure may be cheaply made and readily applied.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a car brake pipe extending substantially lengthwise of a car, a pipe T in said brake pipe, a branch pipe leading from said pipe T, the pipe T having a lug thereon, a bracket for supporting said brake and branch pipes, said bracket comprising a member secured to a portion of the car structure and extending therefrom, the bracket having a slot therein, means associated with said lug and adapted to extend into the slot in the bracket, said slot permitting movement of the lug relative to the bracket whereby the T, the brake pipe and the branch pipe may be adjustably positioned relative to the bracket, and means for clamping the lug and the bracket rigidly together, the bracket being substantially rigid in a plane extending lengthwise of the car whereby the brake and branch pipes are held against movement lengthwise of the car.

2. In combination, a car brake pipe extending substantially longitudinally of a car, a pipe T in said brake pipe, a branch pipe leading from said pipe T, and means for supporting said brake and branch pipes, said means comprising a bracket secured to a portion of the car structure and extending therefrom, the bracket having a slot therein, the pipe T having a lug thereon, the lug having a hole therein adapted to register with the slot in the bracket, and a bolt extending through the hole in said lug and through the slot in the bracket, the slot permitting movement of the bolt relative to the bracket whereby the T, the brake pipe and the branch pipe may be adjustably positioned relative to the bracket, the bolt being adapted to clamp the lug and the bracket rigidly together, the bracket being substantially rigid in a horizontal plane whereby the brake and branch pipes are held against movement longitudinally of the car.

3. In combination, a car brake pipe extending substantially lengthwise of a car, a pipe T in said brake pipe, a branch pipe leading from said pipe T, the pipe T having a lug thereon, a bracket for supporting said brake and branch pipes, said bracket comprising a member secured to a portion of the car structure and extending therefrom, the bracket having a slot therein, means associated with said lug and adapted to extend into the slot in the bracket, said slot permitting movement of the lug relative to the bracket whereby the T, the brake pipe and the branch pipe may be adjustably positioned relative to the bracket, spacing means interposed between the lug and the bracket to fill the space between said lug and the bracket, and means for clamping the lug, the spacing means and the bracket rigidly together, the bracket being substantially rigid in a plane extending lengthwise of the car whereby the brake and branch pipes are held against movement lengthwise of the car.

4. In combination, a car brake pipe extending substantially lengthwise of a car, a pipe T in said brake pipe, a branch pipe leading from said T, a bracket for supporting said brake and branch pipes, said bracket comprising a member formed of sheet metal and having a portion adapted to be secured to a portion of the car structure, and a portion projecting therefrom, the bracket being arranged with the face of the sheet metal positioned substantially in a plane extending lengthwise of the car, the bracket having an aperture therein at a point spaced from the portion secured to the car, the pipe T having a lug thereon, the lug having a hole therein adapted to register with the aperture in the bracket, and a bolt extending through the hole in the lug and the aperture in the bracket and being adapted to clamp the lug and the bracket rigidly together, the bracket being relatively wide whereby it is substantially rigid in a plane extending lengthwise of the car and whereby the brake and branch pipes are held against movement lengthwise of the car.

5. In combination, a car brake pipe extending substantially lengthwise of a car, a pipe T in said brake pipe, a branch pipe leading from said T, a bracket for supporting said brake and branch pipes, said bracket comprising a member formed of sheet metal, the bracket being arranged with the face of the sheet metal positioned substantially in a plane extending lengthwise of the car, one end of the bracket being adapted to be secured to a portion of the car structure, the other end of the bracket being bent over upon itself to provide an elongated opening, the pipe T having a lug thereon, the lug having a hole therein adapted to register with the opening in the bracket, and a bolt extending through the hole in the lug and the opening in the bracket and being adapted to clamp the lug and the bracket rigidly together, the bracket being relatively wide whereby it is substantially rigid in a plane extending lengthwise of the car and whereby the brake and branch pipes are held against movement lengthwise of the car.

6. In a device of the class described, a sheet metal member having adjacent one end a portion of substantially uniform width, said portion being bent over upon itself to provide an elongated opening, and having a securing portion adjacent the other end adapted to be secured to a supporting structure, the portion of said member intermediate the above named portions increasing in width from a point adjacent the portion of uniform width to a point adjacent the securing portion.

CLYDE C. FARMER.